United States Patent [19]

Kobayashi et al.

[11] Patent Number: 5,461,520
[45] Date of Patent: Oct. 24, 1995

[54] RECORDING OR REPRODUCING APPARATUS HAVING A TAPE LOADING MECHANISM AND A DEW CONDENSATION DETECTING FACILITY

[75] Inventors: Junji Kobayashi; Hidetoshi Matsuoka, both of Tokyo, Japan

[73] Assignee: Canon Kabushiki Kaisha, Tokyo, Japan

[21] Appl. No.: 377,668

[22] Filed: Jan. 24, 1995

Related U.S. Application Data

[63] Continuation of Ser. No. 775,707, Oct. 10, 1991, abandoned.

[30] Foreign Application Priority Data

Oct. 15, 1990 [JP] Japan .................................. 2-273357
Apr. 19, 1991 [JP] Japan .................................. 3-087078

[51] Int. Cl.$^6$ ............................................. G11B 15/18
[52] U.S. Cl. .................................. 360/71; 360/84; 360/85
[58] Field of Search ............................. 360/71, 84, 85, 360/83, 74.1, 74.2, 74.3, 74.5, 128

[56] References Cited

U.S. PATENT DOCUMENTS 4,011,588  3/1977  Yosuda et al. ............................ 360/71
4,951,161  8/1990  Suzuki et al. ............................ 360/71

Primary Examiner—Scott J. Sugarman
Assistant Examiner—Muhammad N. Edun
Attorney, Agent, or Firm—Robin, Blecker, Daley & Driscoll

[57] ABSTRACT

A recording or reproducing apparatus according to the present invention includes a loading member movable between an unloading position at which a tape is accommodated into a cassette and a loading position at which the tape is pulled out from the cassette and wrapped around a rotary head drum to enable recording or reproduction, a detecting circuit for causing the rotary head drum to start rotating when the loading member is located at a predetermined position between the unloading and loading positions and the tape is wrapped around the rotary head drum by a predetermined angle, and detecting a rotational speed which the rotary head drum reaches within a predetermined time, and a control circuit for driving the loading member to the loading position if it is determined that the rotary head drum is not wet with dew condensation from the rotational speed of the rotary head drum detected by the detecting circuit, and if it is determined that the rotary head drum is wet with dew condensation, driving the loading member to the unloading position.

15 Claims, 9 Drawing Sheets

5,461,520

RECORDING OR REPRODUCING APPARATUS HAVING A TAPE LOADING MECHANISM AND A DEW CONDENSATION DETECTING FACILITY

This is a continuation application under 37 CFR 1.62 of prior application Ser. No. 07/775,707 filed on Oct. 10, 1991 (aban.)

BACKGROUND OF THE INVENTION

1. Field of the Invention

The present invention relates to a recording or reproducing apparatus capable of preventing a tape from being accidentally stuck to a rotary head drum provided with a head (hereinafter referred to as a "rotary drum") owing to dew condensation occurring on the rotary drum, excessively pulled out from a reel and wound around the rotary drum during tape loading under dew-condensation conditions.

2. Description of the Related Art

A conventional magnetic recording or reproducing apparatus of this type is arranged to start tape loading with a rotary drum kept rotated while causing a brake to act on a reel table positioned on a side where a tape is pulled out by the rotation of the rotary head. This arrangement is intended to prevent the tape from accidentally sticking to the rotary drum and being excessively pulled out from a reel by the resultant sticking force when the tape comes in contact with the rotary drum wet with dew condensation.

However, since the conventional example is arranged in the above-described manner such that the tape is pulled out from a cassette while applying a brake, there is the problem that, in the case of loading at an end portion of the tape, if no tape remains on the reel positioned on a take-up side, the tape cannot be pulled out and a loading operation becomes impossible. To cope with this problem, the conventional arrangement requires the complicated operation of detecting a tape end before loading and transporting the tape toward the take-up side within the cassette before the loading on the basis of the detection result to prevent the above-described winding accident. Such a complicated operation is not only time-consuming but also requires high torque for driving the reel table in order to transport the tape within the cassette before loading. Hence, torque-switching means for selecting the high torque is also required.

SUMMARY OF THE INVENTION

It is, therefore, an object of the present invention to solve the above-described problems involved in the conventional example.

Another object of the present invention is to provide a recording or reproducing apparatus capable of loading a tape without applying a brake to a reel table even when a rotary drum is wet with dew condensation and also of smoothly loading the tape without the need to detect a tape end or to transport the tape in a cassette on the basis of the detection result.

To achieve the above objects, according to one aspect of the present invention, there is provided a recording or reproducing apparatus which includes loading means movable between an unloading position at which a tape is accommodated into a cassette and a loading position at which the tape is pulled out from the cassette and wrapped around a rotary drum to enable recording or reproduction; detecting means for causing the rotary drum to start rotating when the loading means is located at a predetermined position between the unloading and loading positions and the tape is wrapped around the rotary drum by a predetermined angle, and detecting a rotational speed which the rotary drum reaches within a predetermined time; and controlling means for driving the loading means to the loading position if it is determined that the rotary drum is not wet with dew condensation from the rotational speed of the rotary drum detected by the detecting means, and if it is determined that the rotary drum is wet with dew condensation, driving said loading means to the unloading position. The recording or reproducing apparatus is arranged to inhibit tape travel by braking only when the rotary drum is rotating and, in addition, to drive the reel table positioned on a tape-take-up side to rotate in a take-up direction, thereby controlling loading of the tape.

In the recording or reproducing apparatus according to the present invention which is arranged as described, loading of a tape is started with the rotary drum remaining inoperative, and at a predetermined position where the tape is wrapped around the rotary drum by the predetermined angle, the loading means temporarily stops the loading. Subsequently, the travel of the tape is inhibited by braking and the rotary drum is activated, and the detecting means compares the rotational frequency detected by the detecting means, which is reached by the rotary drum within a predetermined time, with a preset reference rotational frequency on the basis of which it is determined that the rotary drum is wet with dew condensation. If it is determined that the rotary drum is not wet with dew condensation, the loading is restarted.

If it is determined that the rotary drum is wet with dew condensation, the control means selects unloading. In addition, during the activation of the rotary drum, since the reel table on the tape-take-up side is driven to rotate in the take-up direction, the contact between the tape and the rotary drum is strengthened by the cooperation between the braking to inhibit the tape travel and the rotational drive in the tape-take-up direction, whereby it is possible to detect reliably the presence or absence of dew condensation. Even if the rotary drum is wet with dew condensation, it is possible to satisfactorily prevent the tape from being accidentally wound around the rotary drum owing to the dew condensation. In addition, since the travel of the tape is not inhibited by braking at the time of start of tape loading, it is possible to carry out tape loading at a tape end, and it is also possible to omit a complicated operation or mechanism for carrying out the detection of a tape end before tape loading which has conventionally been required, the switching of drive torques which has been required for tape transportation within the cassette during the tape loading, and so forth.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
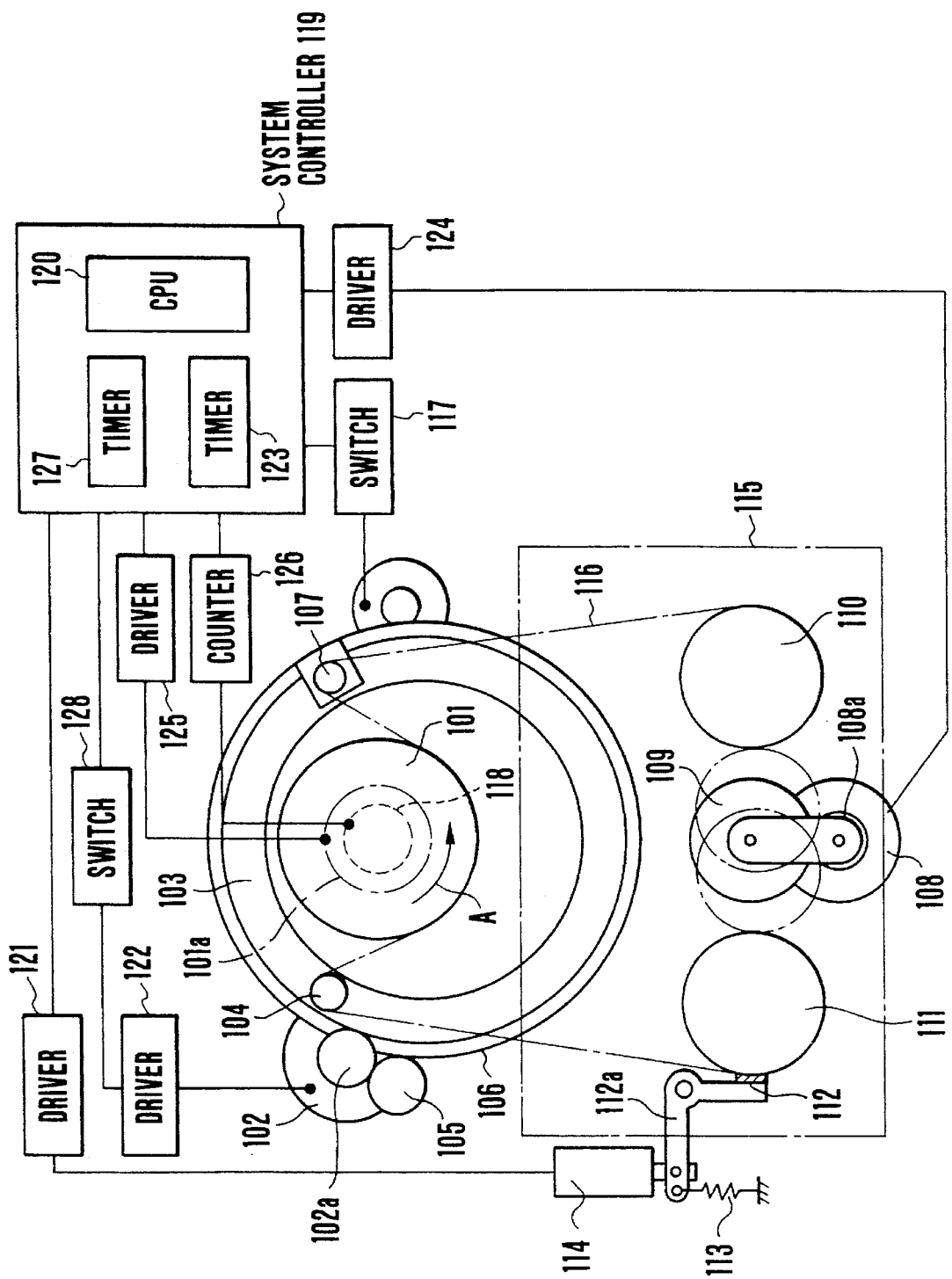
FIG. 1 is an explanatory view showing the essential arrangement of a first embodiment of a magnetic recording or reproducing apparatus according to the present invention, and serves to illustrate tape loading in the magnetic recording or reproducing apparatus.

Preferred embodiments of the present invention will be described below in detail with reference to the accompanying drawings.

A first embodiment in which the present invention is applied to a video tape recorder will be described below with reference to FIGS. 1 to 3. The terms "clockwise", "counterclockwise", "up" and other similar expressions as used herein are intended to apply only to the positions or orientations of elements as illustrated in the drawings.

(First Embodiment)

FIG. 1 is an explanatory view showing the essential arrangement of the first embodiment of a magnetic recording or reproducing apparatus according to the present invention, and serves to illustrate tape loading in the magnetic recording or reproducing apparatus. FIG. 2 is a control block diagram of the first embodiment of the magnetic recording or reproducing apparatus. FIG. 3 is a flowchart used for explaining a tape loading operation of the first embodiment of the magnetic recording or reproducing apparatus.

Figure 2:
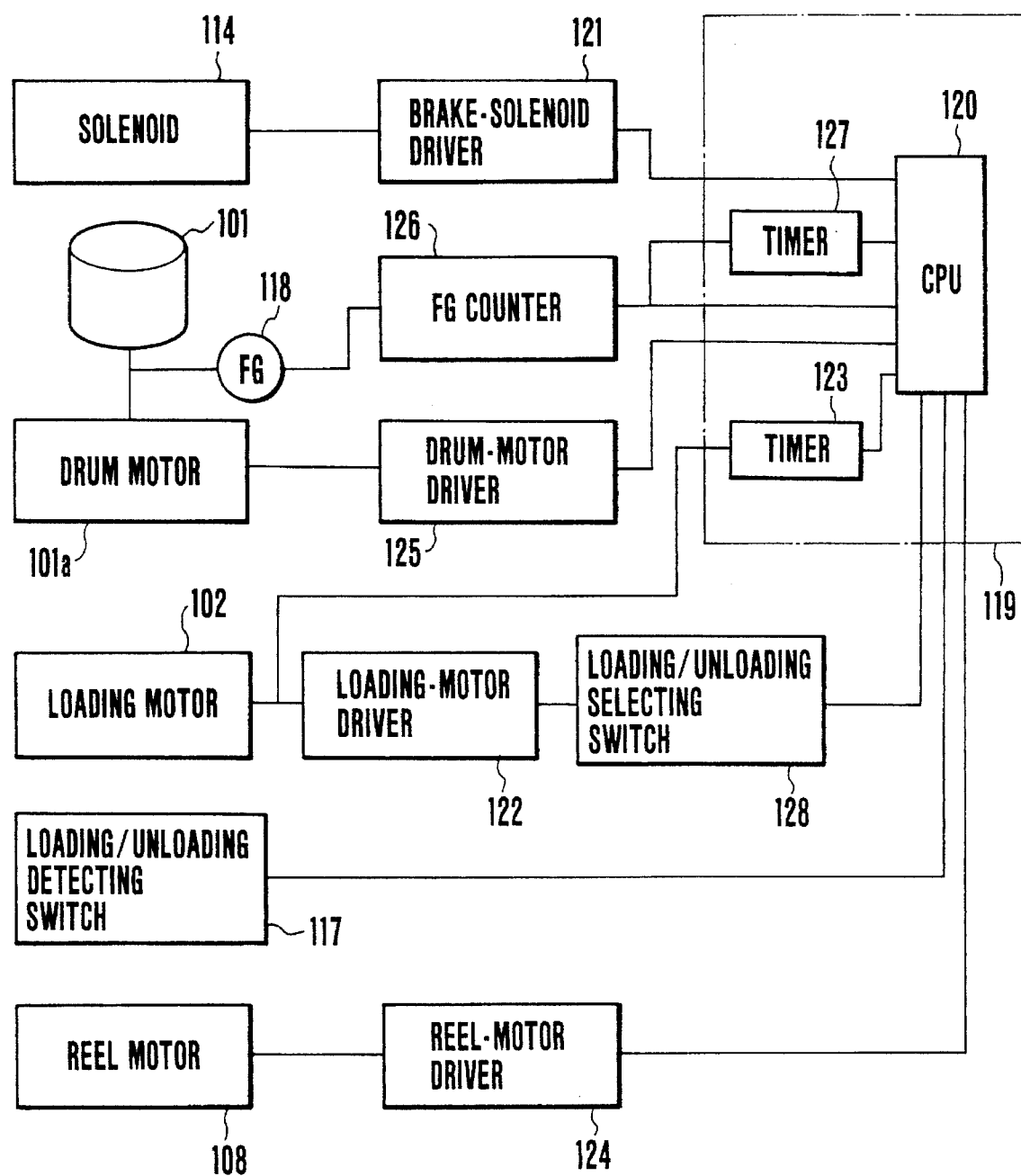
FIG. 2 is a control block diagram of the first embodiment of the magnetic recording or reproducing apparatus.

Referring to FIGS. 1 and 2, the shown magnetic recording or reproducing apparatus includes a rotary drum 101, a drum motor 101a and a loading motor 102. When the loading motor 102 is driven to rotate in a counterclockwise direction, a post 104 positioned on an upper loading ring 103 is made to turn in its loading direction through a gear 102a, while a post 107 positioned on a lower loading ring 106 is made to turn in its loading direction through the gear 102a as well as a gear 105.

When a reel motor 108 is driven to rotate in the clockwise direction, a reel table 110 is made to rotate through gears 108a and 109. When the reel motor 108 is driven to rotate in the counterclockwise direction, a reel table 111 is made to rotate through the gears 108a and 109. Each of the reel tables 110 and 111 includes a torque limiter (not shown) which serves to generate predetermined torque. A brake 112 is pressed into contact with the reel table 111 by a spring 113. When a solenoid 114 is energized, a lever 112a is pulled up against the urging force of the spring 113 and the brake 112 is released.

A rectangular block 115 defined by dot-dashed lines represents a cassette, and a tape is denoted by reference numeral 116. A loading/unloading detecting switch 117 detects the angle of rotation of the lower loading ring 106 to detect the completion of loading or unloading. A frequency generator (FG) 118 generates a frequency in synchronism with the rotation of the rotary drum 101. A system controller 119 includes a central processing unit (CPU) 120, a timer 123 for detecting a tape wrapping position, and a timer 127 for setting the detection time required to detect the rotational frequency of the rotary drum 101.

The shown magnetic recording or reproducing apparatus also includes a brake solenoid driver 121 for turning on and off the solenoid 114, a loading-motor driver 122 for driving and controlling the loading motor 102, a reel-motor driver 124 for driving and controlling the reel motor 108, a drum-motor driver 125 for driving and controlling the drum motor 101a, and an FG counter 126 for detecting the rotational frequency of the rotary drum 101 on the basis of an output from the FG 118. The FG counter 126 detects a rotational frequency which the rotary drum 101 reaches within a predetermined time set by the timer 127. In the first embodiment, an arrangement is adopted in which such a rotational frequency is compared with a reference rotational frequency and a loading/unloading selection switch 128 carries out switching between tape loading and tape unloading in accordance with whether the rotational frequency is greater or less than the reference rotational frequency.

The operation of the first embodiment will be described below with reference to the above-described arrangement.

Figure 3:
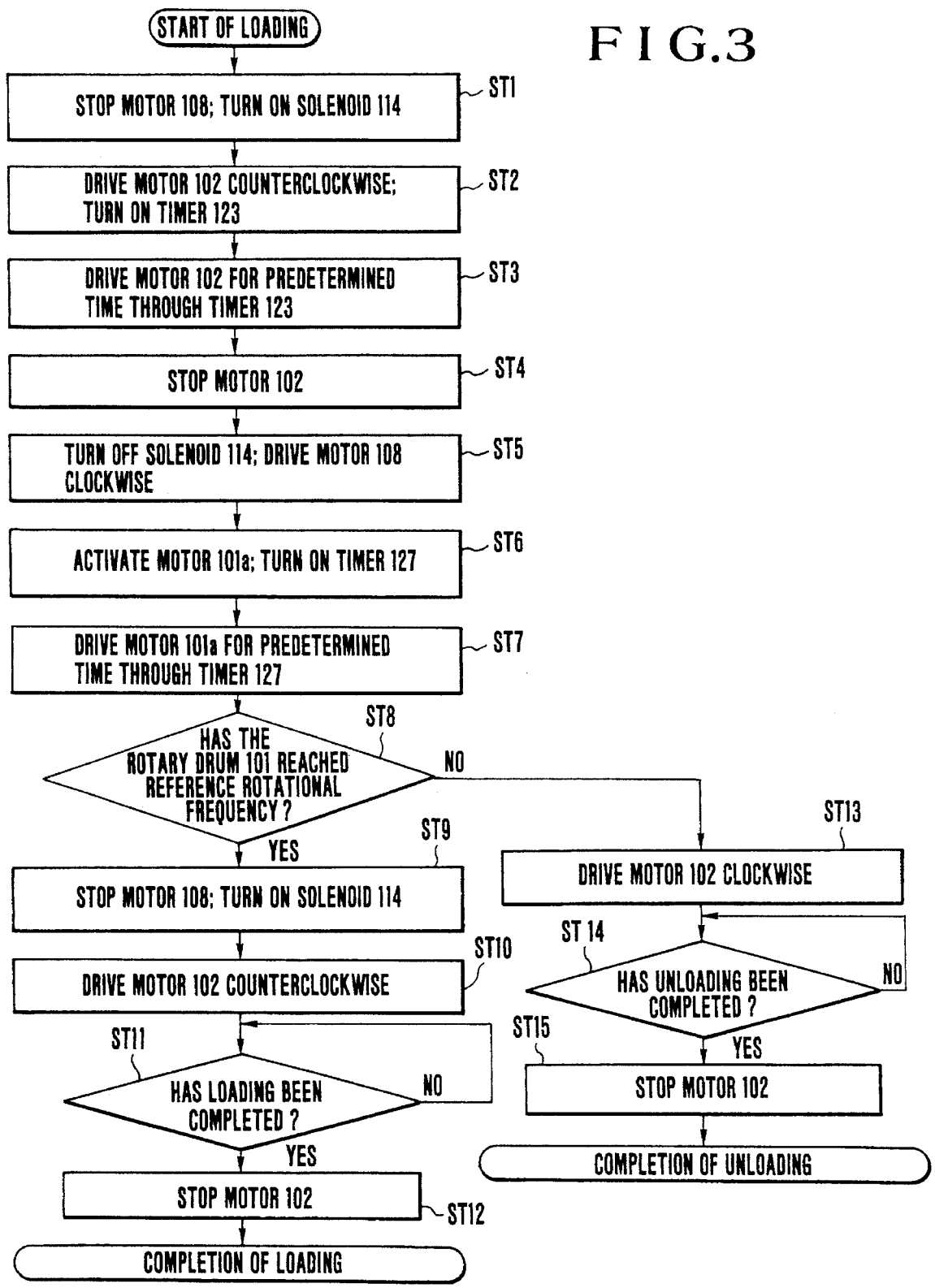
FIG. 3 is a flowchart used for explaining a tape loading operation of the first embodiment of the magnetic recording or reproducing apparatus.

Referring to FIGS. 1 to 3, first of all, although not specifically shown, the cassette 115 is accommodated into the magnetic recording or reproducing apparatus. In Step ST1 of FIG. 3, the solenoid 114 is turned on with the loading motor 102 remaining inoperative so that the reel tables 110 and 111 are placed in a freely rotatable state. In Step ST2, when the loading motor 102 is driven to rotate in the counterclockwise direction, the timer 123 is simultaneously turned on. In Step ST3, the loading motor 102 is driven for a predetermined time on the basis of the counting of the timer 123 and the posts 104 and 107 pull out the tape 116 and wrap it around the rotary drum 101. At the time when the tape 116 is wrapped around the rotary drum 101 by a predetermined angle (for example, the tape 116 is set in the position shown in FIG. 1), the loading motor 102 is stopped temporarily (Step ST4). Then, in Step ST5, the solenoid 114 is turned off and the reel motor 108 is driven to rotate in the clockwise direction. In Step ST6, the drum motor 101a is activated with the reel table 111 braked, thereby causing the rotary drum 101 to rotate in the counterclockwise direction, i.e., in the direction indicated by the arrow A shown in FIG. 1, and at the same time the timer 127 is turned on. At this time, in Step ST7, the rotational frequency of the rotary drum 101 is detected for a predetermined time by means of the FG 118, the FG counter 126 and the timer 127. If the rotational frequency reaches the reference rotational frequency within the predetermined time (Step ST8), the reel motor 108 is stopped and the solenoid 114 is turned on in Step ST9. In Step ST10, the loading motor 102 is driven to rotate counterclockwise, whereby the tape loading is continued. Then, if the completion of the tape loading is detected by the loading/unloading detecting switch 117 in Step ST11, the loading motor 102 is stopped to complete the tape loading.

If the rotational frequency of the rotary drum 101 does not reach the reference rotational frequency (Step ST8) in spite of the passage of the predetermined time in Step ST7, the CPU 120 determines that dew condensation has occurred which causes the tape 116 to stick to the rotary drum 101 and hinders the rotary drum 101 from rotating normally. In Step S13, the motors 102 and 108 are made to rotate in the clockwise direction by means of the loading/unloading selection switch 128 to carry out tape unloading. Then, if the loading/unloading detecting switch 117 detects the completion of the tape unloading in Step ST14, the loading motor 102 is stopped to complete the tape unloading in Step ST15.

During the rotation of the rotary drum 101, the reel motor 108 is made to rotate in the clockwise direction and the tape 116 is reliably pressed in contact with the rotary drum 101. Accordingly, it is possible to detect correctly dew condensation through the state of rotation of the rotary drum 101.

With the above-described arrangement and operation, it is possible to completely prevent the tape 116 from accidentally sticking to and being wound around the rotary drum 101 even when the rotary drum 101 is wet with dew condensation. In addition, it is possible to omit a complicated operation or mechanism for carrying out the detection of a tape end before tape loading which has conventionally been required for tape loading at the tape end, the switching of drive torques which has been required for tape transportation in a cassette during the tape loading, and so forth.

Although in the first embodiment the detection of the rotational frequency of the rotary drum 101 is effected on the basis of the output of the FG 118, the use of the FG 118 is not a limiting example, and other means may also be utilized which are useful for detecting the rotational frequency of the drum motor 101a, such as the counter electromotive force of the drum motor 101a. In addition, a temporary stop position during tape loading may be set to an arbitrary position before the position of completion of the tape loading in which the tape 116 is wrapped around the rotary drum 101. Detection of such a temporary stop position may be carried out by utilizing an arrangement for measuring the time elapsed after the start of the tape loading or an arrangement for detecting the positions of the posts 104 and 107 on the loading rings 103 and 106 by means of a position detecting switch. In addition, the reference rotational frequency to be compared with the rotational frequency of the rotary drum 101 may be set to an appropriate rotational frequency which permits dew condensation to be detected during the period from the time of activation until the rotary drum 101 reaches its normal rotational frequency.

In the first embodiment, for detection of dew condensation, if the rotational speed of the rotary drum 101 is greater than or equal to the reference rotational frequency, it is determined that no dew condensation has occurred, whereas if the rotational speed of the rotary drum 101 is less than the reference rotational frequency, it is determined that dew condensation has occurred. However, the present invention may also be achieved by adopting an arrangement in which if the rotational speed of the rotary drum 101 is greater than the reference rotational frequency, it is determined that no dew condensation has occurred, whereas if the rotational speed is less than or equal to the reference rotational frequency, it is determined that dew condensation has occurred.

As described above, according to the first embodiment, tape loading is started with the rotary drum kept inoperative and with no tape travel inhibited by braking and, at an arbitrary position where the tape is wrapped around the rotary drum by a predetermined angle, the loading of the tape is temporarily stopped and rotation of the rotary head is started. It is then determined whether the rotary drum is wet with dew condensation, on the basis of the rotational frequency which is reached by the rotary drum within a predetermined time. If it is determined that the rotary drum is not wet with dew condensation, the tape loading is restarted. If it is determined that the rotary drum is wet with dew condensation, tape unloading is selected and the reel table on the take-up side is made to rotate in the take-up direction at the time of activation of the rotary drum. In the above-described arrangement, even if the rotary drum is wet with dew condensation, it is possible to detect reliably the dew condensation, whereby it is possible to completely prevent the tape from accidentally sticking to and being wound around the rotary drum. In addition, since no tape travel is inhibited by braking during the start of loading of the tape, it is possible to start tape loading irrespective of the position of a tape end. Accordingly, it is possible to eliminate the detection of the position of the tape end before tape loading, which detection has been conventionally required, and loss of time due to tape transportation within a cassette during such detection. In addition, it is possible to omit a complicated mechanism for effecting switching to the high drive torque required for the tape transportation within the cassette. In consequence, it is possible to reduce the loading time and cost of the recording or reproducing apparatus.

(Second Embodiment)

The gist of a second embodiment resides in an arrangement in which the present invention is applied to a video tape recorder in which, to reduce the size, a cassette-tape mounting part is provided on a movable chassis which is movable on a stationary chassis to which a rotary drum is secured. In this arrangement, the movable chassis is located at a position close to the rotary drum at the time of the completion of the tape loading.

The second embodiment is described below in detail with reference to the associated drawings.

Figure 4:
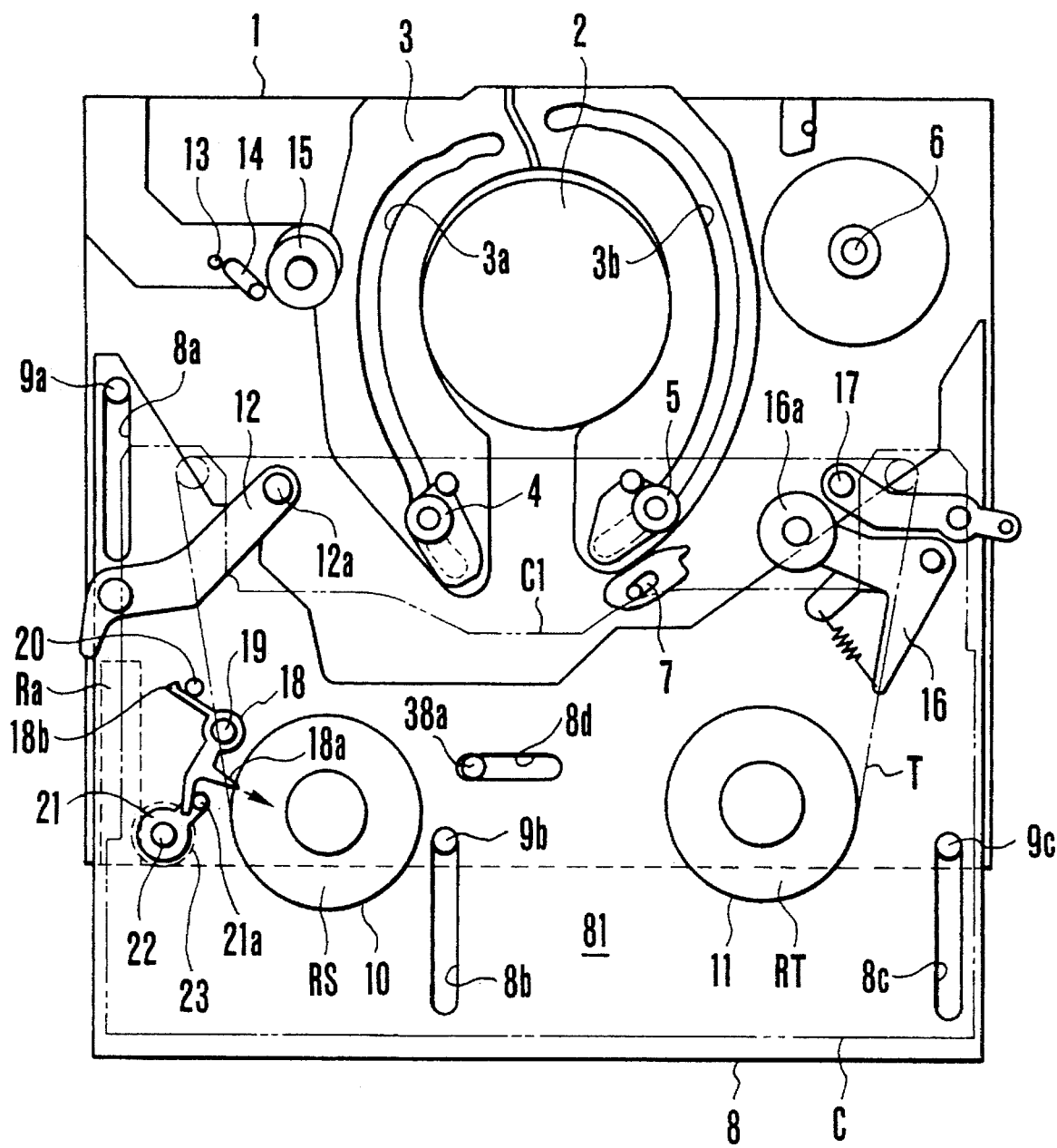
FIG. 4 is a schematic plan view showing a state in which a tape is unloaded by a tape loading mechanism in a second embodiment of the magnetic recording or reproducing apparatus.
Figure 5:
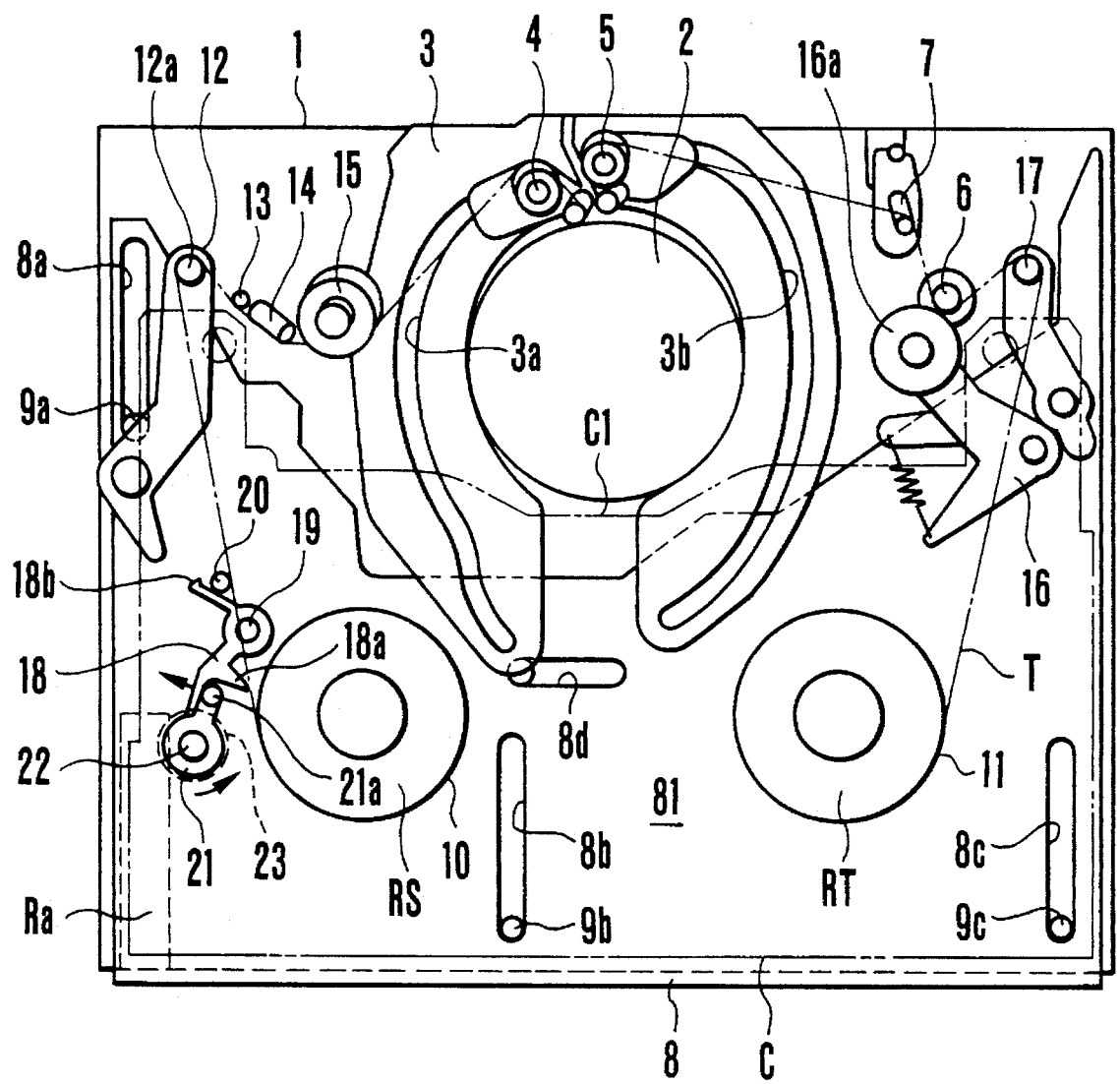
FIG. 5 is a schematic plan view showing a state in which the tape is loaded by the tape loading mechanism in the second embodiment of the magnetic recording or reproducing apparatus.
Figure 6:
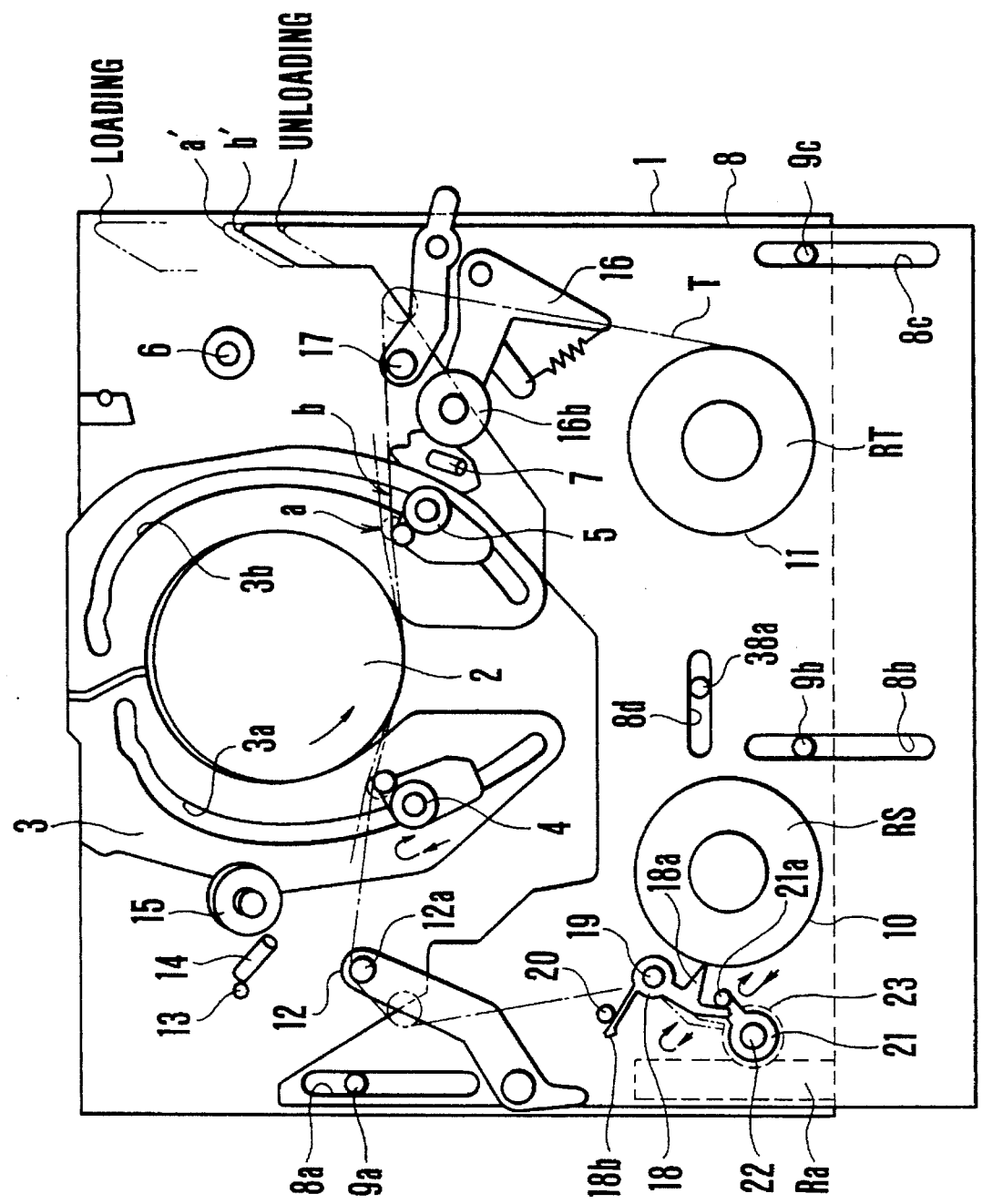
FIG. 6 is a schematic plan view showing the state of detection of dew condensation which is performed during a tape loading operation of the tape loading mechanism in the second embodiment.
Figure 7:
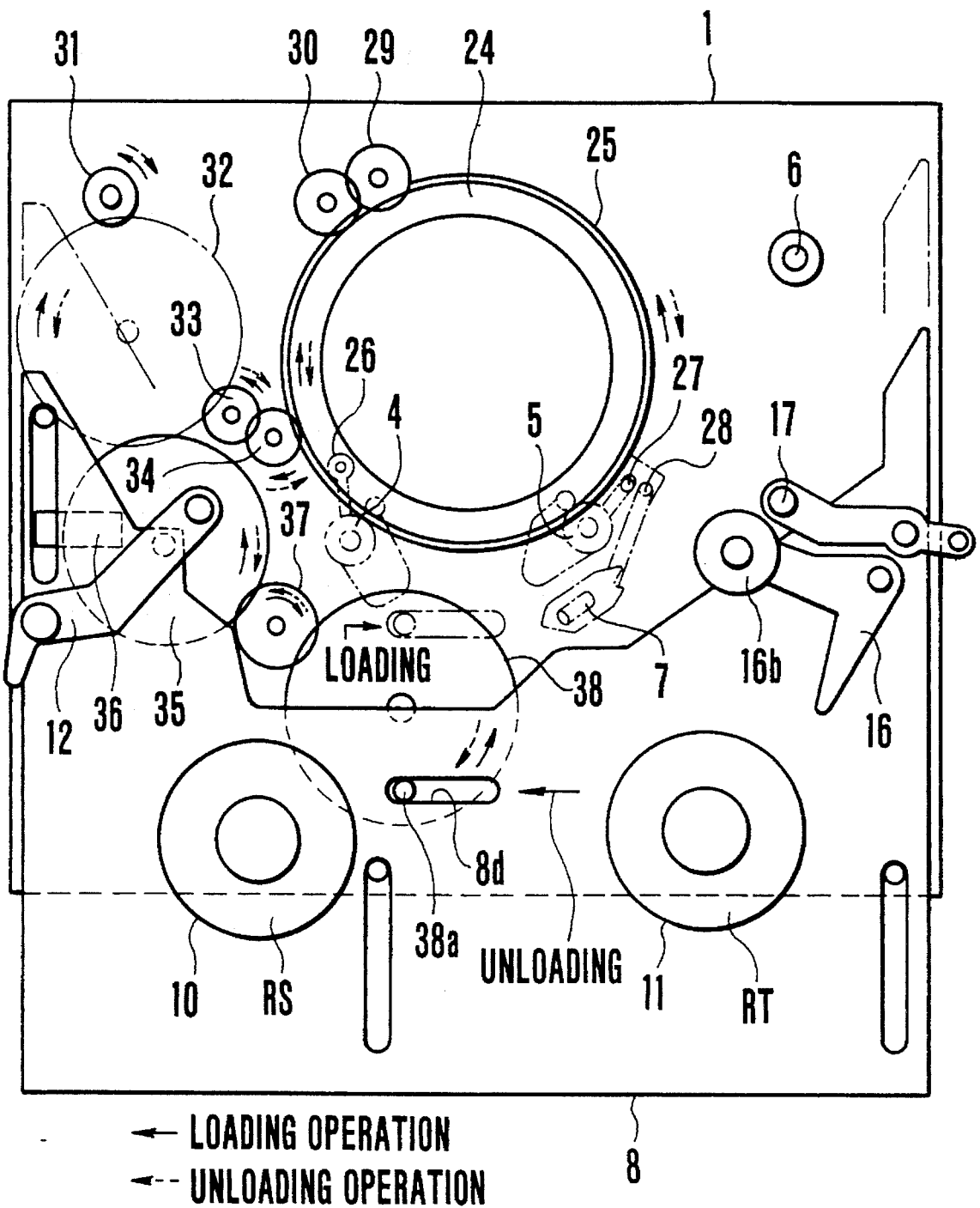
FIG. 7 is a schematic plan view showing the construction of the drive transmission system of a tape loading mechanism in the second embodiment.

FIGS. 4 to 7 show a tape loading mechanism in such a video tape recorder. FIG. 4 shows the state of a tape being unloaded, FIG. 5 shows the state of the tape being loaded, FIG. 6 shows the state of detection of dew condensation during a tape loading operation, and FIG. 7 is a schematic plan view showing the construction of the drive transmission system of the tape loading mechanism according to the second embodiment.

Referring to FIGS. 4 to 7, the shown apparatus includes a main chassis 1 and a rotary drum 2 which is rotatably secured to the main chassis 1 via a drum base 3 in the state of being slanted at a predetermined angle. The rotary drum 2 is arranged to be rotated at a predetermined high speed by a drum motor which is not shown.

A tape-entrance-side movable guide post 4 serves to pull out a tape T from a cassette C and wrap it around the rotary drum 2 by a predetermined angle during a tape loading operation. The tape-entrance-side movable guide post 4 is driven to move along a guide groove 3a formed in the drum base 3, by a driving system which will be described later.

A tape-exit-side movable guide post 5 serves to pull out the tape T from the cassette C and wrap it around the rotary drum 2 by a predetermined angle during the tape loading operation. The tape-exit-side movable guide post 4 is driven to move along a guide groove 3b formed in the drum base 3, by the driving system which will be described later.

A capstan 6 transports the tape T by being rotated by a motor which is not shown. A movable slanted guide post 7 is operated in interlocked relation to the tape-exit-side movable guide post 5 by the driving system which will be described later, and guides toward the capstan 6 the tape T pulled out by the guide post 5.

A vertical guide post 13, a slanted guide post 14 and a guide roller 15 serving as an impedance roller are disposed on the main chassis 1.

A movable chassis (hereinafter referred to as a "slide chassis") 8 is disposed for sliding movement toward and away from the rotary drum 2 on the main chassis 1 by means of slots 8a, 8b and 8c formed in the slide chassis 8 and associated pins 9a, 9b and 9c disposed on the main chassis 1. The slide chassis 8 has a cassette-mounting part 81 formed on its upper surface. During the unloaded state shown in FIG. 4, the slide chassis 8 is moved away from the rotary drum 2 so that the cassette C can be mounted on or removed from the cassette-mounting part 81. During a state in which tape loading is completed and each mode of operation is enabled as shown in FIG. 5, the slide chassis 8 is moved toward the rotary drum 2 to insert a part of the rotary drum 2 into an opening formed in the front side (top side as viewed in FIG. 4) of the cassette C. Accordingly, the space required to accommodate the cassette C can be decreased to reduce the size of the apparatus.

A supply-reel table 10 and a take-up reel table 11 are rotatably disposed on the slide chassis 8, and respectively engage with a supply reel RS and a take-up reel RT of the accommodated cassette C to drive the supply reel RS and the take-up reel RT in directions and at speeds according to individual modes of operation. The supply-reel table 10 and the take-up reel table 11 are driven by a reel motor which is not shown.

A tension regulator 12, which is disposed on the slide chassis 8, detects a tape tension by pressing a tension post 12a against the tape T pulled out from the supply reel RS, and controls a band brake (not shown) disposed around the supply-reel table 10 to maintain the tape tension at a constant level.

A pinch roller lever 16 supports a pinch roller 16a which is pressed against the capstan 6 with the tape T nipped therebetween. A movable guide post 17 guides the tape T which has left the capstan 6 to the take-up reel RT in the cassette C.

A brake lever 18 serves to brake the supply-reel table 10, and is mounted on the slide chassis 8 for turning motion about a shaft 19. An engagement portion 18a for braking the supply-reel table 10 by engagement with the external circumference of the supply-reel table 10 is formed integrally with one end of the brake lever 18, while a spring portion 18b is formed integrally with the other end. The spring portion 18b engages with a stopper pin 20 disposed uprightly on the slide chassis 8 to urge the brake lever 18 counterclockwise, i.e., in the direction in which the engagement portion 18a is made to engage with the supply-reel table 10.

An operating member 21 serves to control the brake lever 18, and is disposed on the slide chassis 8 for turning motion about a pin 22. The operating member 21 has an engagement pin 21a formed so as to engage with an extending end of the brake lever 18, and is coupled to a gear 23 via a friction member (not shown) on the reverse side of the slide chassis 8. The gear 23 at all times meshes with a rack Ra mounted on the main chassis 1. Accordingly, the gear 23 is made to rotate with the sliding movement of the slide chassis 8, and with the rotation of the gear 23. The operating member 21 is urged to turn by the frictional force of the friction member in the same direction as that of the rotation of the gear 23, thus causing the brake lever 18 to operate.

More specifically, if the slide chassis 8 advances toward the rotary drum 2, the gear 23 is made to rotate counterclockwise and the frictionally coupled operating member 21 is urged to turn counterclockwise. The brake lever 18 is made to turn clockwise against the elasticity of the spring portion 18b so that the braking of the supply-reel table 10 is released.

If the slide chassis 8 withdraws from the rotary drum 2, the gear 23 is made to rotate clockwise and the frictionally coupled operating member 21 is urged to turn counterclockwise, thereby moving the engagement pin 21a away from the brake lever 18. The brake lever 18 which has thus been set free is made to engage with the supply-reel table 10 by the elasticity of the spring portion 18b, thereby braking the supply-reel table 10.

As a matter of course, even if the gear 23 rotates in either direction, after the operating member 21 has turned by the required amount and engaged in a predetermined position, the operating member 21 is held in that position with the gear 23 idling with respect to the operating member 21, since the operating member 21 is coupled to the gear 23 by the friction member. In addition, since the frictional force is selected to be stronger than the elastic force of the spring portion 18b of the brake lever 18, it is possible to hold the brake lever 18 at the position to which it has turned, not only during the rotation of the gear 23 but also after the stoppage thereof.

The driving system in the tape loading mechanism shown in FIGS. 4 to 6 will be described with reference to FIG. 7.

FIG. 7 is a schematic view showing the tape loading mechanism for pulling out the tape T from the cassette C and wrapping it around the rotary drum 2 and showing the driving system for driving and controlling the sliding movement of the slide chassis 8. The drum base 3, the rotary drum 2 and other associated members shown in FIGS. 4 to 6 are not illustrated in FIG. 7.

Referring to FIG. 7, loading rings 24 and 25 are independently turnably disposed on the main chassis 1 in the state of being vertically superimposed on each other by a known means. The loading rings 24 and 25 are coupled to the tape-entrance-side movable guide post 4, the tape-exit-side movable guide post 5 and the movable guide post 7 through associated link mechanisms. As the loading rings 24 and 25 turn, the guide post 4 and the guide posts 5 as well as 7 are respectively made to move along the guide grooves 3a and 3b as well as along guides which are not shown.

The loading rings 24 and 25 are coupled to each other by a pair of gears 29 and 30 which mesh with each other, and are arranged to rotate in mutually opposite directions. The upper loading ring 24 is coupled to the tape-entrance-side guide post 4 by a link 26, and is arranged to move the guide post 4 toward the rotary drum 2 with the clockwise turn of the loading ring 24 (refer to FIG. 4). The lower loading ring 25 is coupled to the tape-exit-side guide post 5 and to the movable guide post 7 by links 27 and 28, respectively, and is arranged to move the guide posts 5 and 7 toward the rotary drum 2 with the counterclockwise turn of the loading ring 25.

A driving gear 31 is made to rotate by a loading motor (not shown), and the rotation of the driving gear 31 is transmitted to the lower loading ring 25 through a speed-reducing gear 32 and rotation-transmitting gears 33 and 34. Such a rotation is in turn transmitted to the upper loading gear 24 through the gears 29 and 30.

A mode cam 35 for setting the mode of operation is made to rotate by the speed-reducing gear 32 which is meshed therewith, and provides control to switch the states of the tension regulator 12 and various parts which are not shown, such as brakes, gears and idlers, to states according to a set mode of operation. The rotational position of the mode cam 35 is detected by a mode sensor 36, and on the basis of the output of the mode sensor 36, it is possible to detect correctly various operational states such as the kind of mode of operation, the position of the slide chassis 8 during a loading or unloading operation, and the state of operation of each movable guide post in the tape loading mechanism.

The construction of the mode sensor 36 is not limited to a specific type. For example, an optical sensor may be used to detect a black-and-white pattern formed on one surface of the mode cam 35, or for detecting purposes, a brush may be disposed in contact with a conductor electrode formed on one surface of the main chassis 1 or the mode cam 35.

The rotation of the mode cam 35 is further transmitted to a slide-chassis driving gear 38 through the rotation of a gear 37. An engagement pin 38a is disposed uprightly on the slide-chassis driving gear 38 and is at all times inserted in a slot 8d formed in the slide chassis 8. Accordingly, as the slide-chassis driving gear 38 is made to rotate to and fro by approximately half a turn, the slide chassis 8 can be made to slide toward and away from the rotary drum 2.

As described above, the tape loading mechanism, i.e., the loading rings 24 and 25 and the slide chassis 8, are arranged to be driven in mutually interlocked relation by a common loading motor. In FIG. 7, the direction of driving in a loading operation is indicated by solid arrows and the direction of driving in an unloading operation by dotted arrows.

During the tape-unloaded state of FIG. 4, when the loading motor (not shown) is driven to rotate counterclockwise, the loading rings 24 and 25 are made to rotate clockwise and counterclockwise, respectively, to move the respective movable guide posts 4, 5 and 7 toward the rotary drum 2, thereby pulling out the tape T from the reels RS and RT in the cassette C to wrap it around the rotary drum 2. In the meantime, the slide-chassis driving gear 38 is made to rotate counterclockwise to advance the slide chassis 8 toward the rotary drum 2.

In the above-described manner, the cassette C on the slide chassis 8 is made to advance toward the rotary drum 2, and a part of the rotary drum 2 is inserted into the opening formed in the front side (top side as viewed in FIG. 4) of the cassette C. In the meantime, the tension regulator 12, the pinch roller 16 and the movable guide post 17 are made to move to their predetermined positions, forming the tape path shown in FIG. 5, whereby the mechanism is set to a tape-loaded state in which the tape T is loaded so that recording or reproduction is enabled. During the tape-loaded state, it is possible to perform various modes of operation such as recording, reproduction, other high-speed tape driving and special reproduction.

During the tape-unloaded state shown in FIG. 4, the brake lever 18 is urged counterclockwise by the elasticity of the spring portion 18b and the engagement portion 18a is pressed against the external circumference of the supply-reel table 10 to brake it. When a tape loading operation is started, the slide chassis 8 advances toward the rotary drum 2 and the operating member 21 is made to turn counterclockwise via the gear 23 to turn the brake lever 18 clockwise, thereby releasing the lock of the supply-reel table 10. Accordingly, in the tape loading operation, the tape T is pulled out from both of the supply reel RS and the take-up reel RT (whose brake is released by a mechanism (not shown) during this time).

During a tape unloading operation, the loading motor is reversed to perform an operation completely reverse to the above-described operation. At this time, since the operating member 21 moves away from the brake lever 18 by the withdrawal of the slide chassis 8, the brake lever 18 is made to turn counterclockwise by the elasticity of the spring portion 18b, thereby braking the supply-reel table 10. Thus, the tape T pulled out from the cassette C is wound around the take-up-reel table 11 which is being rotated.

Figure 8:
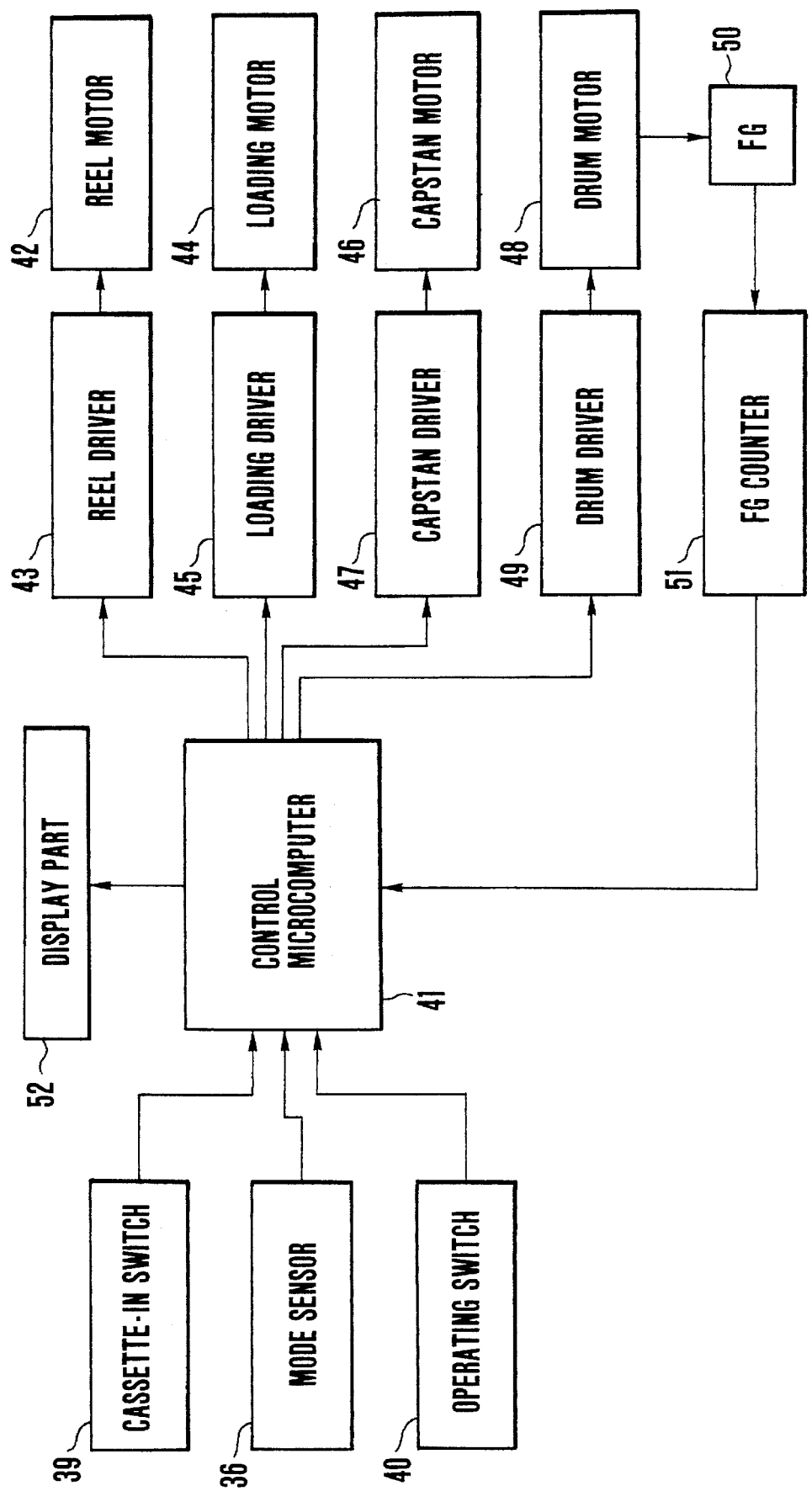
FIG. 8 is a block diagram showing a control system in the second embodiment.

FIG. 8 is a block diagram showing a control system for the above-described tape loading mechanism and a tape transport mechanism.

Referring to FIG. 8, the shown arrangement includes a mode sensor 36 for detecting a mode of operation which is presently selected and the state of operation on the basis of the rotational position of the mode cam 35, a cassette-IN switch 39 for detecting whether the cassette C has been mounted on the cassette-mounting part 81 formed on the slide chassis 8 during the tape-unloaded state in which the cassette C is not accommodated as shown in FIG. 4, and a group of various operating switches 40 which are used to set various modes of operation such as recording, reproduction and trigger. A control microcomputer 41 receives the output of each of the mode sensors 36 and the switches 39 and 40 and performs control according to an instruction and the state of operation, thereby controlling generally the entire system.

Referring to the output side of the control microcomputer 41, the shown arrangement includes a reel motor 42 (not shown in FIGS. 4 to 7) for driving the supply-reel table 10 and the take-up-reel table 11 through a driver 43, a loading motor 44 for driving the tape loading mechanism through a driver 45, a capstan motor 46 for driving the capstan 6 through a driver 47, and a drum motor 48 for driving the rotary drum 2 through a driver 49. The shown arrangement also includes an FG pulse generator 50 for generating FG pulses in accordance with the rotation of the drum motor 48 for the purpose of detecting the rotational frequency of the rotary drum 2, a counter 51 for counting the FG pulses outputted from the FG pulse generator 50, and a display part 52 for displaying the state of operation of each kind, an instruction, the mode of operation, an error warning and so on. In the second embodiment, to reduce the size of the apparatus, an electronic viewfinder consisting of a CRT, an LED, a liquid-crystal device or the like is utilized as the display part 52.

The control system of the present apparatus is constructed as described above. A dew-condensation detecting operation according to the second embodiment will now be described in sequence with reference to the flowchart shown in FIG. 9.

In a case where the cassette C is unmounted during the tape-unloaded state shown in FIG. 4, if the cassette C is mounted on the cassette-mounting part 81 formed on the slide chassis 8, a tape-loading operation is started automatically.

Figure 9:
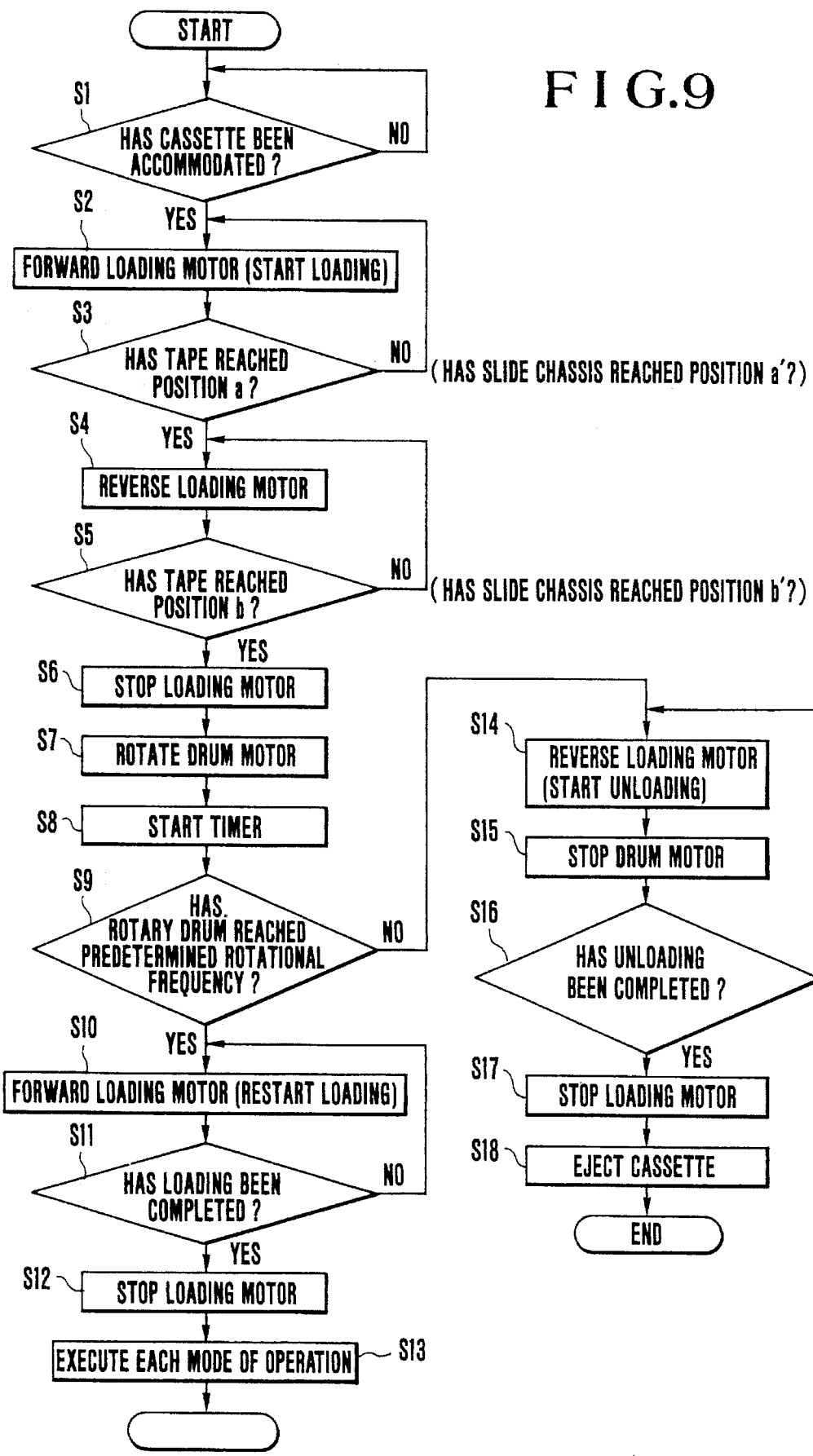
FIG. 9 is a flowchart used for explaining the control operation of the control system in the second embodiment.

Referring to the flowchart of FIG. 9, when the mounting of the cassette C is detected through the cassette-IN switch 39 in Step S1, the process proceeds to Step S2, where the loading motor 44 is driven to rotate forward (counterclockwise) according to an instruction outputted from the control microcomputer 41. The movable guide posts 4, 5 and 7 move toward the rotary drum 2 to pull out the tape T from the cassette C, while the slide chassis 8 advances to move the cassette C toward the rotary drum 2. Thus, the tape-loading operation is started in the above-described manner. As the slide chassis 8 advances, the operating member 21 is made to turn counterclockwise, causing the brake lever 18 to move away from the supply-reel table 10. The brake of the supply-reel table 10 is released, whereby it becomes possible to pull out the tape T from the supply reel RS.

In Step S3, it is detected through the mode sensor 36 adjacent to the mode cam 35 whether the tape T has been pulled out from the cassette C up to the position a shown in FIG. 6 where the tape T is placed in light contact with the rotary drum 2. The tape-loading operation is continued until the tape T reaches the position a. The symbol "a'" indicates the forward position of the slide chassis 8 corresponding to the position a of the tape T.

If it is detected that the tape T pulled out by the movable guide posts 4 and 5 has reached the position a in FIG. 6, the process proceeds to Step S4, where the loading motor 44 is reversed (driven clockwise).

In this manner, each movable guide post 4 and 5 and the slide chassis 8 are withdrawn. As the slide chassis 8 withdraws, the operating member 21 is made to turn clockwise and the brake lever 18 is made to turn toward the supply-reel table 10 by the elasticity of the spring portion 18*b*, whereby the supply-reel table 10 is locked.

In Step S5, on the basis of the rotational position of the mode cam 35, it is detected through the mode sensor 36 whether the position of the tape T and the withdrawal position of the slide chassis 8 have reached the positions b and b' shown in FIG. 6, respectively. If it is detected that they have reached the positions b and b', the loading motor 44 is stopped in Step S6 and the drum motor 48 is driven through the driver 49 to rotate the rotary drum 2 in Step S7.

Thus, each movable guide post 4 and 5 withdraws slightly and the tape T is made to withdraw to the position b in FIG. 6, whereby the tape T is brought into slight contact with the rotary drum 2.

The above-described reverse operation of the slide chassis 8 is an operation for preventing the tape T from accidentally sticking to and being wound around the rotary drum 2 wet with dew condensation when the rotary drum 2 rotates in contact with the tape T, by braking and locking the supply-reel table 10 which serves as the pull-out side for the tape T with respect to the direction of rotation (counterclockwise rotation) of the rotary drum 2.

When the rotary drum 2 is activated, a timer is started in Step S8. After a predetermined time has elapsed, it is determined in Step S9 whether the rotary drum 2 has reached a predetermined rotational frequency. The elapsed time of the timer is normally set to the time required from the moment the rotary drum 2 is activated until the moment the rotary drum 2 reaches its normal rotational frequency. A decision as to the rotational frequency of the rotary drum 2 is made on the basis of a count obtained within a predetermined time by counting through the counter 51 the FG pulses which are generated from the FG pulse generator 50 in accordance with the rotation of the rotary drum 2.

If the rotary drum 2 has reached the normal rotational frequency, this indicates that the rotary drum 2 is smoothly rotating with respect to the tape T, and it is determined that there is no dew condensation. If the rotary drum 2 is not activated and the rotational frequency does not reach a predetermined rotational frequency, it is determined that the tape T and the rotary drum 3 have stuck to each other. In this case, since the supply-reel table 10 is braked which serves as the pull-out side for the tape T, the tape T is not pulled out, and does not accidentally wind around the rotary drum 2 wet with dew condensation.

If the predetermined rotational frequency has been reached in Step S9, the process proceeds to Step S10, where the loading motor 44 is again driven forward to restart the tape-loading operation. If it is determined in Step S11 through the mode sensor 36 that the tape-loading operation has been completed, the process proceeds to Step S12, where the loading motor 44 is stopped, and in Step S13, recording, reproduction and other various modes of operation are enabled.

If the rotary drum 2 is not activated and its rotational frequency does not reach the predetermined rotational frequency and hence it is determined in Step S9 that dew condensation has occurred, the process proceeds to Step S14, where the loading motor 44 is driven in the direction of reverse rotation to perform a tape-unloading operation. In Step S15, the rotary drum 2 is stopped.

If the completion of the tape-unloading operation has been detected in Step S16, the loading motor 44 is stopped in Step S17, and in Step S18, the cassette C is ejected by a mechanism which is not shown. At this time, warning of dew condensation is simultaneously displayed in the display part 52.

As described above, according to the second embodiment, during the performance of a tape-loading operation, the tape-loading operation is stopped with the tape T remaining in slight contact with the rotary drum 2, and in this state, the rotary drum 2 is made to rotate and the manner of increase of the rotational frequency thereof is checked to determine whether there is dew condensation. Accordingly, unlike the conventional example, a dedicated dew-condensation sensor and associated drive and decision circuits are not needed so that a simplified construction is accomplished (the aforesaid embodiment may of course be used in combination with a conventional dew-condensation sensor).

As described above, in the recording or reproducing apparatus according to the second embodiment, the tape-loading operation is stopped with the tape remaining in slight contact with the rotary drum, and in this state, the rotary drum is made to rotate and the presence or absence of dew condensation is determined by detecting whether the rotary drum can be successfully activated. Accordingly, a dedicated dew-condensation sensor and associated drive and decision circuits are not needed and a simplified construction can be accomplished. It is, therefore, possible to reduce the size and cost of the apparatus.

According to second embodiment as well, it is possible to achieve advantages similar to those of the first embodiment described previously, as will be stated below.

A decision as to dew condensation is made while a tape is kept in contact with the rotary drum with the tape-loading operation stopped. Accordingly, it is possible to prevent occurrence of the problem that the tape accidentally sticks to and is wound around the rotary drum in a large amount owing to dew condensation, as in the conventional apparatus which performs a tape-loading operation after causing the rotary drum to rotate.

It is also possible to solve the problem that the tape-loading operation itself becomes impossible if no tape remains on one reel which is not braked, as in the conventional apparatus which, to prevent a winding accident due to dew condensation, performs a tape-loading operation while braking the other reel which serves as a tape-pull-out side.

In addition, it is possible to solve the problem that, to eliminate such a winding accident, the conventional apparatus requires a tape-end (amount-of-remaining-tape) detecting sensor for detecting whether the tape remains on both reels before tape loading, and a circuit associated with the sensor, as well as a complicated operation and drive control of a reel motor for causing each of the reels to rotate by a predetermined amount within the cassette in order to ensure that a predetermined amount of tape is present on each reel table.

As is apparent from the foregoing description, according to the second embodiment, in spite of the simplified construction, it is possible to achieve the great advantage of detecting efficiently and correctly dew condensation without involving a serious accident such as a winding accident during a tape-loading operation.

What is claimed is:

1. A recording or reproducing apparatus arranged to perform recording or reproduction while wrapping a tape-shaped recording medium around a rotary head drum provided with a head, comprising:

(a) loading means movable between a first position at which the tape-shaped recording medium wound around a pair of reels can be pulled out and a second position at which the tape-shaped recording medium is pulled out and wrapped around the rotary head drum to enable recording or reproduction and a predetermined third position between the first and second positions and with the tape-shaped recording medium being wrapped around the rotary head drum by a given angle less than that for enabling recording or reproduction;

(b) first controlling means for causing the rotary drum to rotate after the loading means is located in the predetermined third position;

(c) first detecting means for detecting a rotating condition of the rotary head drum;

(d) second detecting means for detecting the presence or absence of dew condensation on the rotary head drum on the basis of output of the first detecting means in the state that the loading means is located in the predetermined third position; and (e) second controlling means for causing said loading means to move from the third position to the first position if the dew condensation is detected and, if no dew condensation is detected, causing said loading means to move from the third position to the second position.

2. A recording or reproducing apparatus according to claim 1, wherein said detecting means determines that the dew condensation is absent if the rotational frequency of the rotary head drum is either greater than or not less than a reference value, and that the dew condensation is present if the rotational frequency of the rotary head drum is less than the reference value.

3. A recording or reproducing apparatus according to claim 1, further comprising reel tables for mounting the pair of reels, one of the reel tables which mounts a reel operative as a supply side for the tape-shaped recording medium being braked during detection of the presence or absence of the dew condensation.

4. A recording or reproducing apparatus according to claim 3, wherein the reel table which mounts the reel operative as a take-up side for the tape-shaped recording medium is driven to rotate based upon detection of the absence of the dew condensation.

5. A method of loading a tape-shaped recording medium in a recording or reproducing apparatus arranged to perform recording or reproduction while wrapping the tape-shaped recording medium around a rotary head drum provided with a head, comprising the steps of:

(a) wrapping the tape-shaped recording medium around the rotary head drum over a range smaller than a wrapping range in which recording or reproduction is possible;

(b) after the step (a), rotating the rotary head drum;

(c) detecting a rotational speed of the rotary head drum which is being rotated;

(d) comparing the rotational speed with a reference speed and, if the rotational speed is either greater than or not less than the preset reference speed, determining that dew condensation is absent;

(e) if it is determined that there is no dew condensation, wrapping the tape-shaped recording medium around the rotary head drum over a predetermined range in which recording or reproduction is possible; and (f) if it is determined that there is dew condensation, cancelling wrapping of the tape-shaped recording medium around the rotary head drum.

6. A method according to claim 5, wherein the travel of the tape-shaped recording medium is restricted while the rotary head drum is rotating.

7. A method according to claim 5, wherein the rotational speed of the rotary head drum is represented by a rotational frequency.

8. A recording or reproducing apparatus arranged to perform recording or reproduction while wrapping a tape-shaped recording medium around a rotary head drum provided with a head, comprising:

(a) cassette moving means for performing a cassette moving operation to move a cassette which contains the tape-shaped recording medium wound around a pair or reels from a cassette inserting/removing position to a loading position close to the rotary head drum;

(b) loading means for pulling out the tape-shaped recording medium from the cassette and wrapping it around the rotary head drum to form a predetermined tape travel path, in interlocked relation to the operation of said cassette moving means to move the cassette from the cassette inserting/removing position to the loading position;

(c) limiting means for limiting pull-out of the tape-shaped recording medium;

(d) controlling means for detecting whether the tape-shaped recording medium has been wrapped around the rotary head drum by a predetermined amount by said loading means, if it is detected that the tape-shaped recording medium has been wrapped around the rotary head drum by the predetermined amount, stopping the operation of said cassette moving means and that of said loading means and limiting the pull-out of the tape-shaped recording medium by operating said limiting means, and then rotating the rotary head drum;

(e) first detecting means for detecting a rotary condition of the rotary head drum; and (f) second detecting means for detecting the presence or absence of dew condensation on the rotary head drum on the basis of output of the first detecting means in accordance with the operation of said controlling means.

9. A recording or reproducing apparatus according to claim 8, wherein said detecting means detects the presence or absence of the dew condensation by comparing a rotational frequency of the rotary head drum with a reference value.

10. A recording or reproducing apparatus according to claim 9, wherein said detecting means determines that the dew condensation is absent if the rotational frequency of the rotary head drum is either greater than or not less than the reference value.

11. A recording or reproducing apparatus according to claim 8, further comprising reel tables for mounting the pair of reels, one of the reel tables which mounts a reel operative as a supply side for the tape-shaped recording medium being locked by a braking operation during detection of the presence or absence of the dew condensation.

12. A recording or reproducing apparatus according to claim 11, wherein the braking operation is interlocked with the cassette moving operation performed by said cassette moving means.

13. A recording or reproducing apparatus arranged to perform recording or reproduction while wrapping a tape-shaped recording medium around a rotary head drum provided with a head, comprising:

(a) loading means movable between a first position at which the tape-shaped recording medium wound around a supply reel and a take-up reel can be pulled out and a second position at which the tape-shaped recording medium is pulled out and wrapped around the rotary head drum to enable recording or reproduction;

(b) detecting means for detecting the presence or absence of dew condensation on the rotary head drum with said loading means being located in a predetermined third position between the first and second positions and with the tape-shaped recording medium being wrapped around the rotary head drum by a given angle less than that enabling recording or reproduction; and (c) a supply reel table and a take-up reel table, said supply reel table mounting a reel operative as a supply side for the tape-shaped recording medium and being braked during detection of the presence or absence of the dew condensation by detecting a rotating condition of the rotary head drum;

wherein the rotary head drum is made to rotate in the direction of correspondence with the direction of traveling of the tape-shaped recording medium from the supply reel to the take-up reel.

14. A recording or reproducing apparatus according to claim 13, wherein the take-up reel table mounts a reel operative as a take-up side for the tape-shaped recording medium which is driven to rotate based upon the detection of the absence of dew condensation.

15. A recording or reproducing apparatus according to claim 14, further comprising:

controlling means for causing said loading means to move from the third position to the first position if dew condensation is detected and, if no dew condensation is detected, causing said loading means to move from the third position to the second position.

* * * * *